Oct. 16, 1956
H. R. NOYES
2,766,497
MECHANICAL LEVERAGE AUGMENTER
Filed April 7, 1952
3 Sheets-Sheet 1
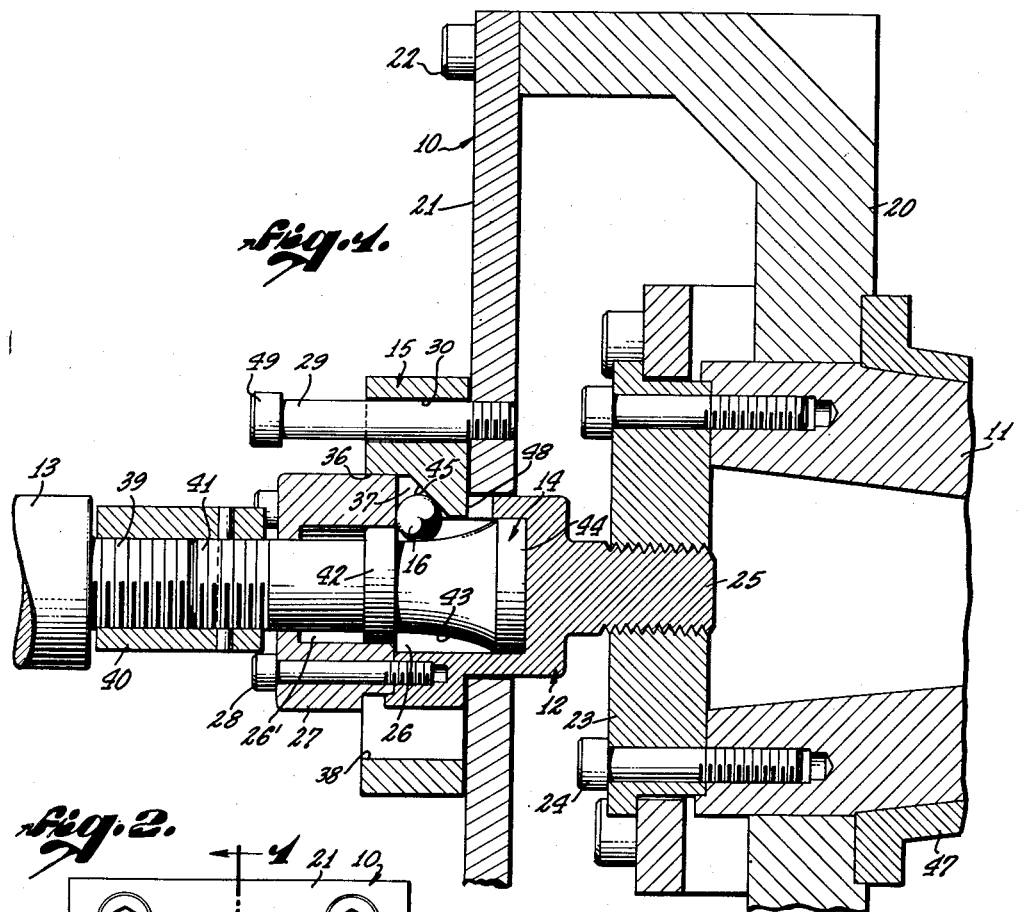
HAZLEHURST ROSS NOYES,
INVENTOR.
HUEBNER, BEEHLER,
WORREL & HERZIG,
ATTORNEYS.
BY Oct. 16, 1956      H. R. NOYES      2,766,497
MECHANICAL LEVERAGE AUGMENTER
Filed April 7, 1952      3 Sheets-Sheet 2
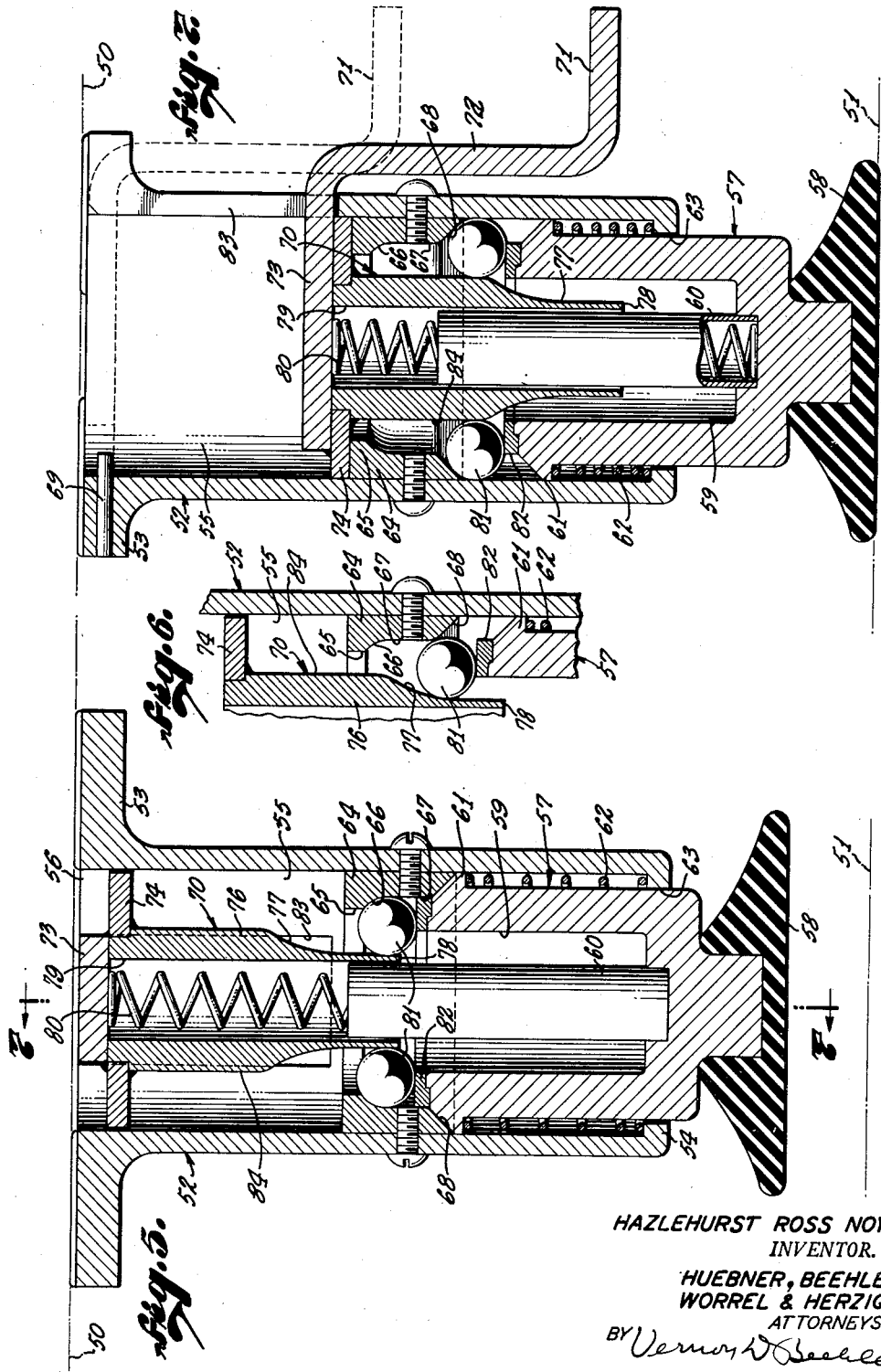
HAZLEHURST ROSS NOYES,
INVENTOR.
HUEBNER, BEEHLER,
WORREL & HERZIG,
ATTORNEYS.

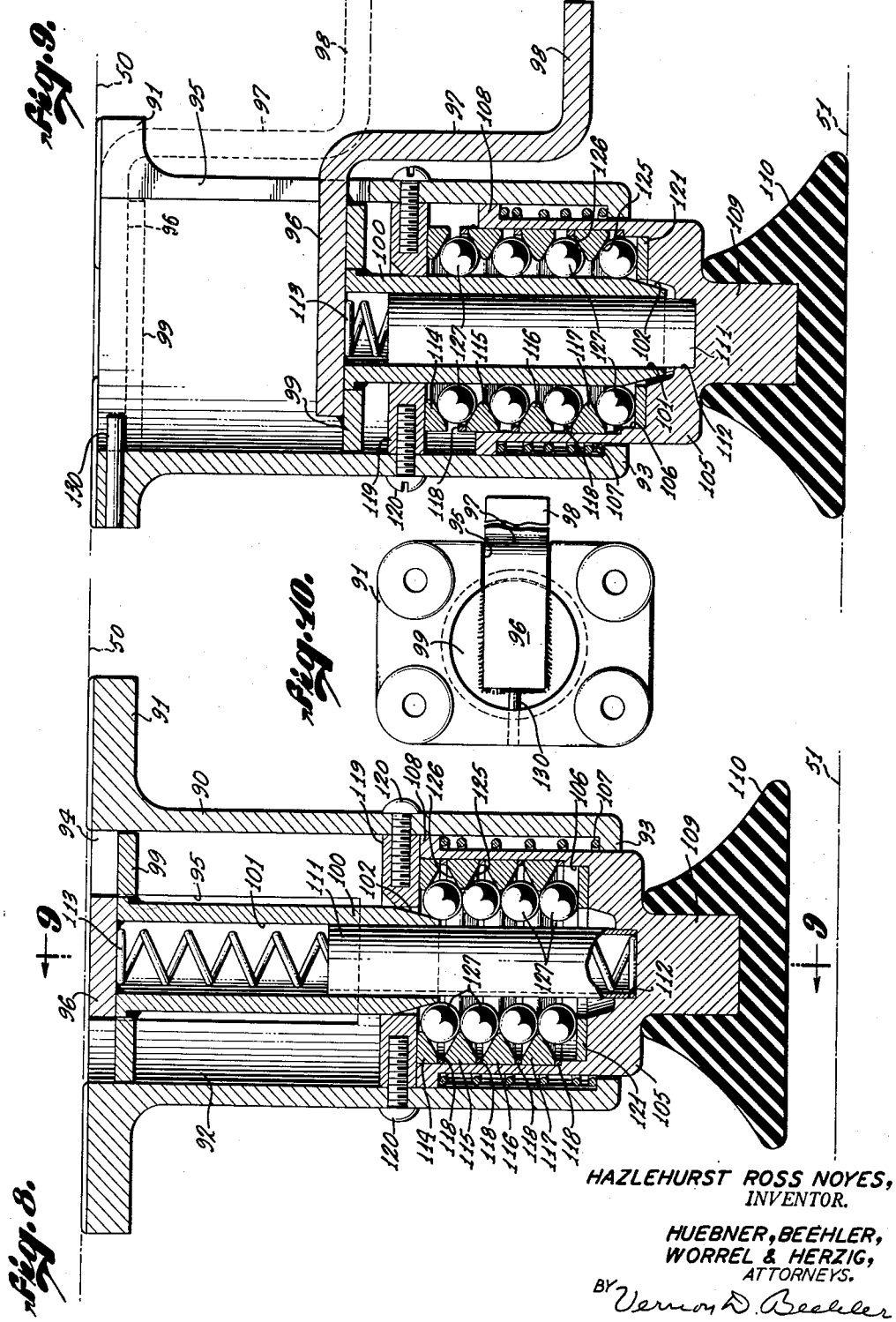

United States Patent Office 2,766,497
Patented Oct. 16, 1956

2,766,497

MECHANICAL LEVERAGE AUGMENTER

Hazlehurst Ross Noyes, Los Angeles, Calif., assignor to Aerol Co., Inc., Los Angeles, Calif., a corporation of California Application April 7, 1952, Serial No. 280,981

12 Claims. (Cl. 22—93)

The application refers to mechanical motions and has particular reference to a leverage augmenter of a type which can be used where only a short throw or movement is sufficient and wherein an extremely great mechanical advantage is requisite. The invention, while being especially well adapted to use in connection with such mechanisms as core pullers, also has other advantageous uses as, for example, use as a floor brake in trucks suited to shifting heavy merchandise over a floor.

In the molding industry considerable difficulty has been experienced in the past in initially breaking a core loose from a mold. The solidified metal in a mold ordinarily has such a tenacious grip upon the core that a great deal of power must be employed to pull the core loose if power alone is relied upon. In some instances it is not possible to apply sufficient power by means heretofore available which has given rise to the practice of hammering and pounding upon the mold in order to break the core loose. Such practices have necessitated use on one hand of extremely heavy and expensive equipment where great power has been relied upon and, on the other hand, has given rise to excessive breakage and damage of the mold, the core and associated parts where hammering has been relied upon to initially break the core loose.

It is therefore among the objects of the invention to provide a new and improved leverage augmenter associated with a mechanical motion which is capable of initially exerting tremendous force over a short distance to break a core loose from the mold.

Another object of the invention is to provide a new and improved leverage augmenter which is capable of a steadily and progressively increasing mechanical advantage over a short throw to the end that the mechanical advantage may be quickly built up to the point where it is powerful enough to, for example, break a core loose from the mold and thereafter move the core sufficiently far out of the mold to enable a casting to be removed.

Another object of the invention is to provide a new and improved leverage augmenter of sufficient power and smoothness of operation to permit other parts associated therewith as well as the leverage augmenter to be made relatively small in size, thereby substantially minimizing initial cost of the apparatus, minimizing investment in the molds, and moreover reducing to a very great extent the expense of servicing and replacement.

Still another object of the invention is to provide a new and improved leverage augmenter which is especially versatile in its application in that use can be made of it in a great variety of different installations especially wherein a very substantial increase in leverage is advantageous.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a partial sectional view of a mold box and core showing the leverage augmenter of the invention associated therewith in one of its forms, taken on the line 1—1 of Figure 2.

Figure 2 is a left end view of the device as viewed in Figure 1.

Figure 3 is a perspective view of one of the exterior parts of the leverage augmenter.

Figure 4 is a perspective view of one of the interior parts of the leverage augmenter, namely, the part directly attached to the core.

Figure 5 is a vertical sectional view of a form of the leverage augmenter utilized as a floor brake in one position, namely, released position.

Figure 6 is a fragmentary sectional view of leverage supplying parts of the leverage augmenter of Figure 5 shown in an intermediate position.

Figure 7 is a longitudinal sectional view of the leverage augmenter of Figure 5 taken on the line 7—7 of Figure 5 but showing the relationship of the parts in braking position.

Figure 8 is a longitudinal sectional view of still another form of the leverage augmenter employed as a floor brake showing the parts in released position.

Figure 9 is a longitudinal sectional view taken on the line 9—9 of Figure 8 showing the parts in braking position.

Figure 10 is a plan view of the form of the device illustrated in Figures 8 and 9.

In providing the leverage augmenter or mechanical motion here involved, the parts made use of consist essentially of a relatively stationary member which in the case of Figure 1 is a mold box 10, a relatively movable member which is the core 11 and parts associated therewith such, for example, as a cage or bushing 12, a power arm 13 to which is attached a cam element 14, a cam member 15 here shown substantially annular in shape, and a plurality of individual cams 16 which in the form of the invention illustrated in Figure 1 comprise spherical balls. Essentially the stationary member or mold box remains fixed while the power arm exerts an initial pull upon the cam member 14. This initial motion begins the eventual core breaking motion by driving the spherical cams 16 into the wedge-like pocket in which they are located. The wedging action then is transferred as a longitudinal motion from right to left of the top of the cake which results in a movement of the core from right to left to initially break contact. The cam member 15, though it need not be bolted to the mold box, nevertheless is forced against the top of the mold box and is included as a stationary part of the device. After the core has been broken loose by the extremely great mechanical advantage, the power arm 13 continues to move from right to left, driving the sperical cams further into the wedge-shaped apertures under which circumstances mechanical advantage continues to be applied but at a faster rate as the pitch of the cam member on the power arm becomes more abrupt. At this point although the rate is faster, the leverage is not so great but remains sufficient for the final pulling loose of the core from the mold. Following this as the power arm continues to move toward the left, the core can be lifted entirely clear from the cast interior of the molded material.

More specifically, and as illustrated in Figures 1, 2, 3 and 4, the mold box generally indicated by the reference character 10 comprises a body 20 and a cover 21 attached thereto by machine screws 22.

Within the mold box the core 11 has secured to the left or outside end a closure or cover plate 23 which is attached by means of machine screws 24 so as to form a permanent part of the core.

The cage 12 has a threaded extension 25 threadedly engaging the closure or plate 23. Within the cage is what may be designated as an axially disposed chamber 26 or in any event a space which, when a cover element 27 is secured to the cage 12 by machine screws 28, becomes an axially disposed chamber, a portion 26' of which is within the cover element 27.

As previously described, the cam member 15, shown in perspective view in Figure 3, circumscribes the cage, as illustrated in Figure 1. The cam member is located on the cover 21 of the mold box by machine screws 29 which fit loosely within appropriate holes 30. Thus mounted the cam member is anchored against rotation but is free to slide along the screws from the position shown in Figure 1 to a position against heads 49 of the screws which provide a stop.

The cage has six radially directed slots 35 extending outwardly from the axially disposed chamber 26. When the cage is mounted within the cam member 15, the radial slots 35 are in alignment with radial recesses 36 of the cam member. Together they form a somewhat wedge-shaped opening 37 clearly shown in Figure 1, there being six of the wedge-shaped openings disposed about the axis of the parts. Cut-out portions 38 serve primarily to reduce the weight of the cam member.

In the embodiment illustrated in Figure 1 the power arm 13 has a threaded end 39 around which is threaded a sleeve 40 which is adapted to receive a similar threaded end 41 of the cam element 14. On the cam element and located within the cover element 27 is a collar 42 and beneath or to the right of the collar, as viewed in Figure 1, there is a cam face 43 circumferentially uniform which has a gradual slope adjacent the collar, which slope turns up progressively sharper near a free end 44 of the cam element 14.

In operation and at the time the casting is made the parts occupy the relative positions shown in Figure 1. In these positions the power arm is moved toward the right to the end of its throw. So also is the cam element 14. In this position the balls 16 are at the largest end of the wedge-shaped openings 37 bearing against the small end of the cam face 43 and an adjacent end of the sloping wall 45 and at the inner end of a surface 46 comprising the face of the cover element 27.

When it is desired to break the core 11 loose from a molded element 47, the power arm 13 is moved from the right to left as viewed in Figure 1. Initially the small end of the cam face 43 begins to ride against the six balls 16. Inasmuch as the slope of the cam face 43 at the small end is very gradual, the balls tend to be shifted only a slight amount into the wedge-shaped openings 37 but with a very considerable force. The initial force is extremely great such as is necessary to initially break the bond between the core and the molded element. As the balls 16 are driven into the wedge-shaped openings, they bear against the sloping walls 45, tending to force the cam member 15 against the adjacent face of the cover 21. The balls also while being pushed into the wedge-shaped openings tend to shift the cover element 27 from right to left, this in turn causing a similar movement of the cage 12, which in turn moves the core 11 from right to left.

After the core has been broken loose, the power arm continues to move toward the left. With this continued movement the more abrupt slope of the cam face 43 approaches and rides against the balls 16, moving them with a reduced mechanical advantage but at a more rapid rate into the bottoms of the wedge-shaped openings 37. This causes a more rapid shift of the core out of contact with the molded element but since the core is already broken loose, the more rapid movement becomes desirable even though operating at a much smaller mechanical advantage.

After the balls have been forced to the extent of their movement into the wedge-shaped openings, the power arm during continued movement may draw the cage 12 until it comes into contact with a face 48 of the cam member 15 and the cam then shifts the cam member also a distance from right to left until the cam member strikes against the heads 49 of the bolts 29. The amount of movement or throw can be determined by the length of the bolts 29.

During return movement the parts move generally in an opposite direction until they reassume the relationship illustrated in Figure 1 already described as the relationship at the time the mold is poured.

In the adaptation of the mechanical movement to a floor lock or brake one type of floor lock is illustrated in Figures 5, 6 and 7. The floor lock there illustrated is one adapted to be attached to a vehicle 50 so as to fix the vehicle temporarily in a chosen location upon a floor surface 51. The floor lock or floor brake comprises a substantially cylindrical housing 52 having a flange 53 at the top for attachment to the vehicle and a bottom 54 for an interior chamber 55, the chamber having an open top portion 56. Within the chamber is a piston 57 having at its lower end a lock member 58 which is designed to engage the floor surface 51.

The piston 57 has a piston chamber 59 therein and within the chamber 59 is a hollow post 60 secured to the piston at the bottom of the chamber. Around the upper end of the piston is a shoulder 61 which is adapted to confine a spring 62 between the shoulder and the bottom 54 of the housing. The shoulder is of such circumference as to provide a smooth sliding fit within the chamber 55. The lower end of the piston is adapted to have a smooth sliding fit with respect to the walls 63 of an opening in the bottom 54.

Also located within the chamber is an annular ring 64 adapted to form a shoulder 65 facing upward. On the lower side of the ring is a curved cam face 66 terminating in a cylindrical portion 67. At the lower end of the cylindrical portion is an annular truncated cam face 68.

To operate the device there is provided what may be appropriately designated as an actuator assembly generally designated by the character 70. The actuator assembly includes a pedal 71 connected by an arm 72 to a horizontal piece 73. To the horizontal piece 73 is welded a disc 74 which has a sliding fit within the chamber 55. Attached to the disc is a sleeve 76, the lower end of which is provided with a progressively sloping cam face 77, the more abrupt slope being near the upper end, the cam face terminating near its lower end 78 in a part where the circumference is virtually cylindrical. At the interior of the sleeve is a bore 79 adapted to house a spring 80, the spring being designed to bear against the horizontal piece 73 at the top and at the bottom against the lower wall of the piston chamber 59. A series of balls or spherical cams 81, two of which are shown in Figure 5, are initially positioned between the lower end 78 of the sleeve, the cam face 66 of the ring 64, and an upper surface of a ring 82 which is attached to the upper end of the piston 57.

Initially the parts occupy the position illustrated in Figure 5 with the horizontal piece 73 of the pedal 71 extending laterally outwardly through a slot 83. When it is desired to set the floor lock or brake, an operator depresses the foot pedal 71, moving it from the dotted line position of Figure 7 to the full line position. Movement of the foot pedal downwardly shifts the actuator assembly downwardly which means that the sleeve 76 in moving downwardly slides the cylindrical lower end 78 against the balls 81 for a short throw. The intermediate position is illustrated in Figure 6. This throw is long enough to move the lock member 58 from its uppermost position illustrated in Figure 5 to a lower position almost in engagement with the floor surface 51. Moreover, as indicated in Figure 6 the balls 81, as they ride on the exterior of the lower end 78 of the sleeve, move from the upper end of the cam face 66 toward the lower end where the balls start to approach the small end of the truncated cam face 68. During this movement the spring 80 is compressed.

As the pedal continues to be pressed further downwardly, the more abruptly curving portion of the cam face 77 begins to press against the balls 81 driving them outwardly against the truncated cam face 68 and then downwardly along the cam face to the positions illustrated in Figure 7. During the last stages of movement pressure on the pedal is sufficient to exert an upward force against the vehicle 50 as well as a downward force against the floor surface 51, thereby establishing a friction lock or brake for the vehicle on the floor surface. At this stage of adjustment the cam face 77 passes the balls 81 slightly until the balls roll against a cylindrical exterior 84 of the sleeve 76. The ball at this point becomes locked in its position against the surrounding surfaces and the vehicle remains locked to the floor. In this position likewise the spring 62 is compressed.

A pin 69 serves as a stop at the upper position of the actuator assembly, the horizontal piece 73 moving up and down in a slot 73'.

When it is desired to release the floor lock, the pedal 71 is elevated at it can be by lifting upward with the toe of the foot. The initial lifting slides the cylindrical exterior 84 out of contact with the balls 81. As soon as the sloping cam face 77 becomes engaged with the balls, the springs 80 and 62, exerting an upward push upon the actuator assembly and piston respectively, tend to first shift the actuator assembly to its uppermost position as shown in the dotted lines in Figure 7 and next the piston 57 from its position upon the floor surface to the elevated position illustrated in Figure 5, where it is stopped by the pin 69.

In a second modified form of the device illustrated in Figures 8, 9 and 10 there is shown a floor brake employing a plurality of sets of separate cam elements adapted in this fashion to effect a gradual but powerful application of the brake to the floor.

In the embodiment chosen for the purpose of illustration there is shown a housing 90 having an upper flanged portion 91 adapted to be secured to the vehicle. Within the housing is a chamber 92 having a bottom 93 and an open top 94. At one side of the housing is an opening 95, illustrated in Figures 9 and 10, which is adapted to accommodate a horizontal piece 96 of an actuator assembly. The horizontal piece has at its outer end an arm 97 and foot pedal 98. At its inside end the horizontal piece 96 is welded or otherwise secured to a disc 99 which fits within the chamber in slidable relationship to the walls of the chamber.

Attached to the underside of the disc and centerably located within the chamber 92 is a sleeve 100 which has an interior bore 101 and a cylindrical exterior. At its lower end the sleeve is tapered to form a cam face 102 of circumferentially uniform dimension.

Within the chamber is a hollow piston 105 having within it a chamber 106. The exterior of the piston is substantially smaller in diameter than the inside wall of the housing which forms the chamber 92 and in the space there formed is a coiled spring 107 bearing at its lower end against the bottom 93 of the chamber 92 and at its upper end against an annular protrusion 108 of the piston. At the lower end of the piston is an extension 109 having mounted thereon a foot piece 110, the foot piece being designed with a broad flat surface adapted to be pushed into contact with the floor surface 51 as was described in connection with the illustration in Figures 5, 6 and 7.

Within the chamber 106 in the piston is a hollow post 111 which is fixed in a suitable recess 112 at the bottom of the chamber. Within the post is a coiled spring 113 bearing against the piston at its lower end and against the horizontal piece 96 of the actuator assembly at its upper end. The post 111 is also dimensioned so as to slide smoothly within the interior of the sleeve 100.

Also located in the chamber 106 is a series of cam rings 114, 115, 116 and 117 arranged one above the other and held apart by separator rings 118. An annular shoulder piece 119 secured within the chamber 92 by screws 120 is located so as to bear against the uppermost cam ring 114 and against which the uppermost ring can be pressed. A washer 121 forms a bottom for the chamber 106.

The cam rings in turn are provided with lower oblique cam faces 125 and upper oblique faces 126. Between upper and lower oblique faces are located balls 127 arranged so that there is a series of balls circumferentially disposed between each pair of upper and lower oblique faces. In initial or raised position the balls and cam rings occupy the positions illustrated in Figure 8. In this position of adjustment the disc 98 is pressed upwardly to a stopped position against a stop pin 130.

In operation of this form of the device when it is desired to set the brake, the operator steps on the foot pedal 98 moving it from the dotted line position of Figure 9, which corresponds to the solid line position of Figure 8, to the solid line position of Figure 9. In the course of movement downwardly the sleeve 100 moves an initial distance during which time the cam face 102 moves against the balls 120 of the uppermost set. This results in forcing the balls outwardly against the adjacent lower and upper oblique faces respectively of the cam rings 114 and 115. The balls then are moved outwardly to the position shown for those balls in Figure 9 and result in forcing the cam ring 115 downwardly. This in turn forces the cam rings 116 and 117 downwardly and also the piston downwardly by a corresponding amount. The displacement of the piston is not sufficient, however, to advance it into contact with the floor. As the sleeve and cam face 102 continue to move downwardly, the cam face next contacts the set of balls engaging the lower and upper faces respectively of the cam rings 115 and 116. These rings are then separated one from another into the positions shown in Figure 9, resulting in a still further displacement of the piston downwardly. The foot piece 110 continues to approach the floor. Eventually the foot piece will strike the floor preferably before the lowermost set of balls are engaged by the cam face 102. This being the case, the final camming action of the cam face 102 against the lowermost set of balls will exert a very considerable pressure upon the engagement of the foot piece 110 with the floor surface resulting in a tenacious braking action. Inasmuch as the arrangement is such that the balls are eventually in contact with the cylindrical exterior of the sleeve 100, there will be no tendency to urge the sleeve in a reverse direction and the brake remains set.

When it is desired to release the brake it is necessary only to lift the foot pedal 98 with the toe of the foot until the cam face 102 comes into contact with the lowermost set of balls. The springs 113 and 107 will then urge the piston and actuator assembly upwardly a short distance until the lower end of the cam face 102 passes the lowermost set of balls. To further ease off the brake the pedal can then be lifted further until eventually it has been elevated into initial position into which position it is finally forced by the assistance of the springs.

The modified form of the invention of Figures 8, 9 and 10 as described discloses a progressive application of mechanical force at a very great mechanical advantage such that the brake may be advanced under power as well as set under power and thereafter released progressively.

The applications of the mechanical movement at great mechanical advantage herein disclosed and described illustrate a mechanical force the strength of which can be made such that the application of force is great where it needs to be great and diminishes where the call upon the force becomes less. Moreover, the movement as described is further capable of a throw of sufficiently great magnitude to shift the point of application of force from an initial point to its ultimate point of work in any manner needed. The design and arrangement is extremely versatile in its application to sundry movements as exemplified in the embodiments herein disclosed while adhering to the general principles involved.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having herein described my invention what I claim as new and desire to secure by Letters Patent is:

1. In a mechanical motion a leverage augmenter comprising a relatively stationary member, a relatively movable member having an initial position and at least one secondary position removed in a predetermined direction relative to the stationary member, a reciprocating shaft located within the relatively stationary member movable in said predetermined direction relative to the stationary member, a cam face carried by the shaft, a cam face carried by the stationary member angularly disposed relative to the first identified cam face, and a separate cam mounted between said cam faces and adapted to be driven into camming contact therewith and simultaneously shifted in said predetermined direction by force of movement of the shaft whereby the cam member and movable member are shifted from one to another of said positions.

2. In a mechanical motion a leverage augmenter comprising a relatively stationary member, a relatively movable member having an initial position and at least one secondary position relative to the stationary member, a reciprocating actuator movable relative to the stationary member, said actuator having a cam face carried by the actuator, a cam face carried by the stationary member, one of said cam faces being of progressively increasing inclination from an extremely gradual slope to a relatively steep slope as the actuator moves from one to another of said positions, and a separate cam mounted between said cam faces and adapted to be driven into camming contact therewith by force of movement of the actuator whereby the cam member and movable member are initially slowly shifted a slight distance but with great force followed progressively by a more rapid shifting from one to another of said positions.

3. In a mechanical motion a leverage augmenter comprising a relatively stationary member, a relatively movable member having an initial position and at least one secondary position removed in a predetermined direction relative to the stationary member, a reciprocating actuator movable during a power stroke relative to the stationary member in the same direction, said actuator having a cam face thereon, a cam element on the stationary member and having a cam face thereon, one of said cam faces being of progressively increasing inclination as the actuator moves from initial to secondary positions during said power stroke, and a rolling cam of uniform circumferential contour mounted between said cam faces and adapted to be initially driven relatively slowly and with great force into camming contact therewith by force of movement of the actuator whereby the cam member and movable member are shifted from initial to secondary positions, and said movable member being thereafter shifted more rapidly in said direction subject to movement of the actuator at the same initial speed.

4. A core breaker and puller comprising a relatively stationary mold box, a removable core adapted to be mounted therein, a connection on the core, said connection having an axially disposed chamber therein, a power arm occupying a central axial position in the chamber, and a cam element on the power arm facing away from the core, said power arm being mounted movably in the chamber and having a circumferential cam face, said power arm being movable away from the core during the power stroke, a cam member circumscribing said connection and adapted to bear against said mold box, a cam face on the cam member inclined relative to the cam face of the cam element, and cam means adapted to be forced against the respective cam faces thereby to move the connection and attached core relative to the mold box.

5. A core breaker and puller comprising a relatively stationary mold box, a removable core adapted to be mounted therein, a connection secured to the core, said connection having an axially disposed chamber therein, a power arm and a cam element on the power arm mounted movably in the chamber, a substantially annular cam member circumscribing said connection and adapted to bear against said mold box, said cam member having a plurality of circumferentially disposed cam faces, a cam face on said cam element having a very gradual initial inclination relative to the circumferentially disposed cam faces and being shaped to present a progressively increasing inclined portion with respect thereto, and a cam for each circumferentially disposed cam face adapted to be forced against said cam faces initially with great force acting through a small distance thereby to break the core loose and said increasing inclined portion being adapted to move the connection and attached core relative to the mold box.

6. A core breaker and puller comprising a stationary mold box, a removable core adapted to be mounted therein, a cage secured to the core, said cage having an axially disposed chamber therein, a power arm and a cam element on the power arm mounted movably in the chamber in a direction away from the core during the power stroke, said cam element having a circumferentially uniform cam face directed away from the core and having an inclination progressing from approximately zero degrees to a relatively steep slope and terminating in a flat portion of substantially zero degrees slope, a cam member substantially annularly disposed circumscribing said cage and adapted to bear against said mold box, said cam member having a plurality of radially extending recesses each having a cam face therein, a cover element secured to the cage overlying said recesses, and a spherical cam in each recess having a diameter substantially equal to the depth of the recess and adapted to be forced against the cam faces and the cover element thereby initially to break the core from the mold by application of the cam face of small inclination and thereafter to move the cover element and attached core relative to the mold box from a broken loose position to secondary positions.

7. In a mechanical motion a leverage augmenter comprising a relatively stationary member, a relatively movable member having an initial position and at least one secondary position removed in a predetermined direction relative to the stationary member, a connection on the movable member, said connection having an axially disposed chamber therein, a power arm and a cam element on the power arm facing away from the movable member, said cam element being movable in the chamber and having a circumferential cam face, said power arm being movable away from the movable member during a power stroke, a cam member circumscribing said connection and adapted to bear against said stationary member, a cam face on the cam member inclined relative to the cam face of the cam element, and cam means adapted to be forced against the respective cam faces thereby to move the connection and attached movable member relative to the stationary member.

8. In a mechanical motion a leverage augmenter comprising a relatively stationary member, a relatively movable member having an initial position and at least one secondary position removed in a predetermined direction relative to the stationary member, a connection secured to the movable member, said connection having an axially disposed chamber therein, a power arm and a cam element on the power arm mounted movably in the chamber, a substantially annular cam member circumscribing said connection and adapted to bear against said stationary member, said cam member having a plurality of circumferentially disposed cam faces, a cam face on said cam element having a very gradual initial inclination relative to the circumferentially disposed cam faces and being shaped to present a progressively increasing inclined portion with respect thereto, and a cam for each circumferentially disposed cam face adapted to be forced against said cam faces initially with great force acting through a small distance thereby to move the connection and attached movable member relative to the stationary member.

9. In a mechanical motion a leverage augmenter comprising a relatively stationary member having an opening extending therethrough; a relatively movable member; a hollow cage having a chamber defined therein, the cage being movable axially in said opening, the cage comprising side walls around the chamber, an end secured to the movable member, and a cover element opposite said end, said side walls having a circumferentially arranged series of spaced apart elongate slots formed therein extending radially outwardly from the chamber, said elongate slots being so disposed that their longer dimension is axially of the cage, the cover element having an axially disposed opening formed therein and presenting a cam surface extending circumferentially around the cover element opening, said cam surface facing in a direction toward the movable member; a power arm extending through and movable axially in said cover element opening, a cam element on the power arm and reciprocal in the chamber, said cam element having a circumferential cam face inclined radially outwardly from the cam element to face in a direction away from the said movable member, whereby the cam element is of lesser cross-sectional area in that end thereof proximate the cover element opening; a cam member circumscribing said cage and adapted to bear against said stationary member, said cam member having a plurality of radially and inwardly extending projections, said projections being received in respective slots and being of a dimension taken axially of the cam member less than the length of said slots whereby the cage is movable axially with respect to said circumscribing cam member, each projection having a cam surface thereon facing in a direction toward said cam surface on the cover element and being inclined with respect to the cam surface of the cover element and with respect to the said cam face on the cam element; and a plurality of rollers disposed circumferentially of the cam element for rolling engagement wtih said cam face and with said cover element cam surface and with respective surfaces of said projections.

10. A core breaker and puller comprising a relatively stationary mold box having an opening therein; a movable core adapted to be mounted in the mold box; a hollow cage having a chamber defined therein, the cage being movable axially in said opening, the cage comprising side walls around the chamber, an end secured to the core, and a cover element opposite said end, said side walls having a circumferentially arranged series of spaced apart elongate slots formed therein extending radially outwardly from the chamber, said elongate slots being so disposed that their longer dimension is axially of the cage, the cover element having an axially disposed opening formed therein and presenting a cam surface extending circumferentially around the cover element opening, said cam surface facing in a direction toward the movable member; a power arm extending through and movable axially in said cover element opening, a cam element on the power arm and reciprocal in the chamber, said cam element having a circumferential cam face inclined radially outwardly from the cam element to face in a direction away from the core, whereby the cam element is of lesser cross-sectional area in that end thereof proximate the cover element opening; a cam member circumscribing said cage and adapted to bear against the mold box, said cam member having a plurality of radially and inwardly extending projections, said projections being received in respective slots and being of a dimension taken axially of the cam member less than the length of said slots whereby the cage is movable axially with respect to said circumscribing cam member, each projection having a cam surface thereon facing in a direction toward said cam surface on the cover element and being inclined with respect to the cam surface of the cover element and with respect to the said cam face on the cam element; and a plurality of rollers disposed circumferentially of the cam element for rolling engagement with said cam face and with said cover element cam surface and with respective cam surfaces of said projections.

11. In a mechanical motion a leverage augmenter comprising a relatively stationary member having an opening extending therethrough; a relatively movable member; a hollow cage having a chamber defined therein, the cage being movable axially in said opening, the cage comprising side walls around the chamber, an end secured to the movable member, and a cover element opposite said end, said side walls having a circumferentially arranged series of spaced apart elongate slots formed therein extending radially outwardly from the chamber, said elongate slots being so disposed that their longer dimension is axially of the cage, the cover element having an axially disposed opening formed therein and presenting a cam surface extending circumferentially around the cover element opening, said cam surface facing in a direction toward the movable member; a power arm extending through and movable axially in said cover element opening, a cam element on the power arm and reciprocal in the chamber, said cam element having a circumferential cam face inclined radially outwardly from the cam element to face in a direction away from the said movable member, whereby the cam element is of lesser cross-sectional area in that end thereof proximate the cover element opening, said circumferential cover face being shaped to present a progressively increasing inclined portion in a direction from its end of lesser cross-sectional area to its end of greater cross-sectional area; a cam member circumscribing said cage and adapted to bear against said stationary member, said cam member having a plurality of radially and inwardly extending projections, said projections being received in respective slots and being of a dimension taken axially of the cam member less than the length of said slots whereby the cage is movable, axially with respect to said circumscribing cam member, each projection having a cam surface thereon facing in a direction toward said cam surface on the cover element and being inclined with respect to the cam surface of the cover element and with respect to the said cam face on the cam element; and a plurality of rollers disposed circumferentially of the cam element for rolling engagement with said cam face and with said cover element cam surface and with respective cam surfaces of said projections.

12. A core breaker and puller comprising a relatively stationary mold box having an opening therein; a movable core adapted to be mounted in the mold box; a hollow cage having a chamber defined therein, the cage being movable axially in said opening, the cage comprising side walls around the chamber, an end secured to the core and a cover element opposite said end, said side walls having a circumferentially arranged series of spaced apart elongate slots formed therein extending radially outwardly from the chamber, said elongate slots being so disposed that their longer dimension is axially of the cage, the cover element having an axially disposed opening formed therein and presenting a cam surface extending circumferentially around the cover element opening, said cam surface facing in a direction toward the movable member; a power arm extending through and movable axially in said cover element opening, a cam element on the power arm and reciprocal in the chamber, said cam element having a circumferential cam face inclined radially outwardly from the cam element to face in a direction away from the core, whereby the cam element is of lesser cross-sectional area in that end thereof proximate the cover element opening, said circumferential cam face being shaped to present a progressively increasing inclined portion in a direction from its end of lesser cross-sectional area to its end of greater cross-sectional area; a cam member circumscribing said cage and adapted to bear against the mold box, said cam member having a plurality of radially and inwardly extending projections, said projections being received in respective slots and being of a dimension taken axially of the cam member less than the length of said slots whereby the cage is movable axially with respect to said circumscribing cam member, each projection having a cam surface thereon facing in a direction toward said cam surface on the cover element and being inclined with respect to the cam surface of the cover element and with respect to the said cam face on the cam element; and a plurality of rollers disposed circumferentially of the cam element for rolling engagement with said cam face and with said cover element cam surface and with respective cam surfaces of said projections.

References Cited in the file of this patent

UNITED STATES PATENTS

| | | |
|---|---|---|
| 1,645,726 | Vaughan | Oct. 18, 1927 |
| 1,862,551 | Rosander et al. | June 14, 1932 |
| 1,865,244 | Frantz | June 28, 1932 |
| 2,033,036 | Korsmo | Mar. 3, 1936 |
| 2,265,589 | Wild | Dec. 9, 1941 |
| 2,407,060 | Croft | Sept. 3, 1946 |
| 2,439,854 | Lipski | Apr. 20, 1948 |
| 2,477,368 | Gits | July 26, 1949 |
| 2,507,664 | Dudek | May 16, 1950 |
| 2,565,829 | Wedlake | Aug. 28, 1951 |
| 2,589,096 | Landergren | Mar. 11, 1952 |
| 2,658,393 | Woods | Nov. 10, 1953 |